United States Patent
Masuda et al.

(10) Patent No.: US 6,639,045 B2
(45) Date of Patent: Oct. 28, 2003

(54) METHOD OF PRODUCING ALIPHATIC POLYESTER AND PRODUCT OBTAINED THEREBY

(75) Inventors: Takashi Masuda, c/o Tsukuba Center, National Institute of Advanced Industrial Science and Technology of 1-1-1, Higashi, Tsukuba, Ibaraki-ken (JP); Amin Cao, Shanghai (CN)

(73) Assignees: National Institute of Advanced Industrial Science and Technology (JP); Takashi Masuda (JP)

( * ) Notice: Subject to any disclaimer, the term of this patent is extended or adjusted under 35 U.S.C. 154(b) by 0 days.

(21) Appl. No.: 09/946,597

(22) Filed: Sep. 6, 2001

(65) Prior Publication Data

US 2002/0052462 A1 May 2, 2002

(30) Foreign Application Priority Data

Sep. 11, 2000 (JP) .......................... 2000-275705
Mar. 30, 2001 (JP) .......................... 2001-101886

(51) Int. Cl.[7] .............................................. C08G 63/78
(52) U.S. Cl. .................... 528/279; 528/275; 528/286; 528/302; 524/401; 524/414; 524/416; 524/417; 524/433

(58) Field of Search ................................. 528/275, 286, 528/302; 524/401, 433, 414, 416, 417

(56) References Cited

U.S. PATENT DOCUMENTS

| | | | |
|---|---|---|---|
| 5,504,148 A | * 4/1996 | Iwaya et al. | ................. 524/706 |
| 5,519,108 A | 5/1996 | Yuo et al. | ................... 528/287 |
| 6,133,404 A | * 10/2000 | Kang et al. | ................. 524/706 |

FOREIGN PATENT DOCUMENTS

| | | |
|---|---|---|
| EP | 0 909 774 A1 | 10/1998 |
| GB | 793589 | 1/1956 |

* cited by examiner

Primary Examiner—Samuel A. Acquah
(74) Attorney, Agent, or Firm—Lorusso, Loud & Kelly

(57) ABSTRACT

A method of producing an aliphatic polyester, including polycondensing an aliphatic diol and an aliphatic dicarboxylic acid compound, or a prepolymer thereof in the presence of a metal-containing ester interchange catalyst and a phosphorus-containing co-catalyst such as an ammonium, calcium or magnesium salt of hydrogen-containing phosphoric acid or an organic phosphinic acid. An oxycarboxylic acid compound or its prepolymer may also be used as a raw material.

10 Claims, No Drawings

METHOD OF PRODUCING ALIPHATIC POLYESTER AND PRODUCT OBTAINED THEREBY

BACKGROUND OF THE INVENTION

This invention relates to a method of producing an aliphatic polyester and to an aliphatic polyester obtained by the method.

Polyolefins and aromatic polyesters which are now used in a wide variety of fields have a problem because of their lack in biodegradability. While aliphatic polyesters which are biodegradable polymers are attractive, known aliphatic polyesters have a problem that physical properties thereof are not satisfactory and production thereof requires relatively high costs.

For example, polyhydroxybutyrate produced by using microorganisms requires high production costs. In addition, because a difference between the melting point and the decomposition point of polyhydroxybutyrate is small, the polyhydroxybutyrate is apt to be decomposed during molding to cause problems of generation of odor and reduction of mechanical properties. Polycaprolactone, which is one of a few currently industrially produced aliphatic polyesters, has a problem because the melting point is as low as about 60° C. Polymers of hydroxycarboxylic acids, such as polylactic acid, have excellent biodegradability and are usable as topical absorbing material. However, they are only produced through complicated processes.

Aliphatic polyesters obtained by polycondensation of an aliphatic carboxylic acid compound (e.g. aliphatic carboxylic acid, ester or anhydride) and a glycol are known. Such polyesters, however, have a number average molecular weight of only several thousands and are ill-suited for the formation of films and fibers. Thus, methods have been proposed to increase the molecular weight of the aliphatic polyester by crosslinking with a diisocyanate or by using an additional comonomer such as a polyfunctional isocyanate. These methods, however, have a problem because a gel is apt to be formed or because additional process steps are required.

As an ester interchange catalyst for the production of aliphatic polyesters, titanium tetraisopropoxide is generally used. The known catalyst, however, is unsatisfactory with respect to the reaction rate of polyesterification and has an additional problem of coloring of the product. Furthermore, films or fibers prepared from the polyester have not satisfactory mechanical properties such as breaking elongation. With regard to the coloring of the polyester, U.S. Pat. No. 5,504,148 suggests the use of a phosphorus compound, particularly, polyphosphoric acid, as an anti-coloring agent. The use of phosphoric acid or polyphosphric acid, however, cannot sufficiently accelerate the polyesterification and, further, causes a problem of formation of by-products such as tetrahydrofuran derived from a diol.

SUMMARY OF THE INVENTION

It is, therefore, an object of the present invention to provide an industrially applicable method which can produce an aliphatic polyester having a resistance to hydrolysis.

Another object of the present invention is to provide a method which can produce an aliphatic polyester having good mechanical properties and good color tone at a high reaction rate.

It is a further object of the present invention to provide an aliphatic polyester obtained by the above method.

In accomplishing the foregoing objects, there is provided in accordance with the present invention a method of producing an aliphatic polyester, comprising polycondensing a raw material selected from the group consisting of (A1) mixtures of an aliphatic diol and at least one aliphatic dicarboxylic acid compound selected from the group consisting of aliphatic dicarboxylic acids, diesters of aliphatic dicarboxylic acids and aliphatic dicarboxylic acid anhydrides, (A2) prepolymers of mixtures (A1), (A3) oxycarboxylic acid compounds, (A4) prepolymers of oxycarboxylic acid compounds (A3), (A5) mixtures of (a) an aliphatic diol, (b) at least one aliphatic dicarboxylic acid compound selected from the group consisting of aliphatic dicarboxylic acids, diesters of aliphatic dicarboxylic acids and aliphatic dicarboxylic acid anhydrides and (c) at least one auxiliary compound selected from the group consisting of aliphatic compounds and aromatic compounds having at least two functional groups which are reactive with at least one of (a) and (b), (A6) prepolymers of mixtures (A5), (A7) mixtures of (d) at least one oxycarboxylic acid compound and (e) at least one auxiliary compound other than oxycarboxylic acid compounds selected from the group consisting of aliphatic compounds and aromatic compounds having at least two functional groups which are reactive with (d), and (A8) prepolymers of mixtures (A7) in the presence of a metal-containing ester interchange catalyst and a phosphorus-containing co-catalyst selected from the group consisting of (B1) organic phosphinic acids, (B2) monoammonium salts of hydrogen-containing phosphoric acids, (B3) monoammonium salts of hydrogen-containing polyphosphoric acids, (B4) calcium salts of hydrogen-containing phosphoric acids, (B5) calcium salts of hydrogen-containing polyphosphoric acids, (B6) magnesium salts of hydrogen-containing phosphoric acids, (B7) magnesium salts of hydrogen-containing polyphosphoric acids, and (B8) diarylphosphinic acids Other objects, features and advantages of the present invention will become apparent from the detailed description of the preferred embodiments to follow.

DETAILED DESCRIPTION OF THE PREFERRED EMBODIMENTS OF THE INVENTION

A method of producing an aliphatic polyester according to the present invention includes a step of subjecting a raw material to polycondensation. The raw material is selected from the following substances (A1) through (A6).

Raw material (A1) is a mixture of an aliphatic diol and at least one aliphatic dicarboxylic acid compound selected from aliphatic dicarboxylic acids, diesters of aliphatic dicarboxylic acids and aliphatic dicarboxylic acid anhydrides. The aliphatic dicarboxylic acid compound may be represented by the following formula (1) or (2):

$$R^{11}OOC\text{—}R^1\text{—}COOR^{11} \quad (1)$$

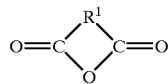
(2)

wherein $R^1$ represents a divalent aliphatic group having 1–12 carbon atoms, preferably 1–10 carbon atoms, and $R^{11}$ represents a hydrogen atom, a lower alkyl group or an aryl group.

The divalent aliphatic group $R^1$ may be cyclic or linear and may be saturated or unsaturated. The divalent aliphatic group may contain a hetero atom such as oxygen. Illustrative of the divalent aliphatic groups are an alkylene group which may contain an ether linkage, an alkenylene group which may contain an ether linkage, an alkyleneoxy group and an oxyalkylene group. Specific examples of the divalent aliphatic groups include —$CH_2$—, —$C_2H_4$—, —$CH_2O$—, —$CH_2OCH_2$—, —$C_3H_6$—, —$C_4H_8$—, —$C_6H_{12}$—, —$C_8H_{16}$—, —$C_{12}H_{24}$— and —$C_{12}H_{22}$—.

The lower alkyl group $R^{11}$ may have 1–6 carbon atoms, preferably 1–4 carbon atoms. The aryl group $R^{11}$ may have 6–10 carbon atoms, preferably 6–8 carbon atoms, such as phenyl.

Illustrative of the aliphatic dicarboxylic acid compounds are succinic acid, adipic acid, sebacic acid, suberic acid, dodecanoic acid, diglycolic acid and acid anhydrides thereof.

The aliphatic diol to be used in conjunction with the above aliphatic dicarboxylic acid compounds may be represented by the following formula (3):

$$HO\text{—}R^2\text{—}OH \quad (3)$$

wherein $R^2$ represents a divalent aliphatic group having 1–12 carbon atoms, preferably 2–10 carbon atoms, and $R^{11}$ represents a hydrogen atom, a lower alkyl group or an aryl group.

The divalent aliphatic group $R^1$ may be cyclic or linear and may be saturated or unsaturated. The divalent aliphatic group may contain a hetero atom such as oxygen. Illustrative of the divalent aliphatic groups are an alkylene group which may contain an ether linkage, an alkenylene group which may contain an ether linkage, an alkyleneoxy group and an oxyalkylene group. Specific examples of the divalent aliphatic groups include —$CH_2$—, —$C_2H_4$—, —$C_3H_6$—, —$C_4H_8$—, —$C_6H_{12}$—, —$C_8H_{16}$—, —$C_{12}H_{24}$—, —$C_{12}H_{22}$— (dodecenyl), —$C_6H_{10}$— (cyclohexenyl), —$CH_2O$— and —$CH_2OCH_2$—.

The aliphatic diol is generally used in an amount of 1–2 moles, preferably 1.02–1.6 moles, per mole of the carboxylic acid groups contained in the raw material (A1).

Raw material (A2) is a prepolymer of the above mixture (A1).

Raw material (A3) is an oxycarboxylic acid compound. The oxycarboxylic acid compound may be represented by the following formula (4) or (5):

$$HO\text{—}R^3\text{—}COOR^{12} \quad (4)$$

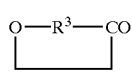
(5)

wherein $R^3$ represents a divalent aliphatic group having 1–10 carbon atoms, preferably 2–8 carbon atoms, and $R^{12}$ represents a hydrogen atom, a lower alkyl group or an aryl group.

Examples of the divalent aliphatic groups $R^3$ in the formula (4) include those described above with regard to divalent aliphatic groups $R^1$ and $R^2$. The lower alkyl group $R^{12}$ may have 1–6 carbon atoms, preferably 1–4 carbon atoms. The aryl group $R^{12}$ may have 6–10 carbon atoms, preferably 6–8 carbon atoms, such as phenyl. Illustrative of suitable oxycarboxylic acids of the formula (4) are glycolic acid, lactic acid and buryric acid. The oxycarboxylic acid compound may be a cyclic diester (lactide) obtained by dehydration of two molecules of an oxycarboxylic acid such as glycolic acid or lactic acid.

Examples of the divalent aliphatic groups $R^3$ (lactones) in the formula (5) include divalent, cyclic or linear aliphatic groups having 2–10 carbon atoms, preferably 2–5 carbon atoms. Illustrative of suitable lactones are caprolactone, valerolactone and laurolactone.

Raw material (A4) is a prepolymer of the above oxycarboxylic acid compound (A3).

Raw material (A5) is a mixture of (a) an aliphatic diol, (b) at least one aliphatic dicarboxylic acid compound selected from the group consisting of aliphatic dicarboxylic acids, diesters of aliphatic dicarboxylic acids and aliphatic dicarboxylic acid anhydrides and (c) at least one auxiliary compound selected from the group consisting of aliphatic compounds and aromatic compounds having at least two functional groups which are reactive with at least one of (a) and (b).

The aliphatic diol (a) may be the same as that described above with reference to the raw material (A1) and, thus, may be the compound of the formula (3). The aliphatic dicarboxylic acid compound (b) may be the same as that described above with reference the raw material (A1) and, thus, may be the compound of the formula (1) or (2).

The aliphatic diol (a) is generally used in an amount of 1–2 moles, preferably 1.02–1.6 moles, per mole of the carboxylic acid groups contained in the raw material (A5).

The auxiliary compound (c) is generally used in such an amount that the content of the auxiliary compound (c) in the aliphatic polyester is not greater than 50 mole %, preferably not greater than 40 mole % based on a total of the monomer components contained in the aliphatic polyester.

The auxiliary compound (c), namely an aliphatic or aromatic compound having at least two functional groups capable of reacting with at least one of the diol (a) and the aliphatic dicarboxylic acid compound (b) are preferably selected from oxycarboxylic acid compounds, carbonic acid esters, terephthalic acid compounds, polyhydric alcohols having at least three hydroxyl groups and polyoxyalkylene glycols.

The oxycarboxylic acid compounds as the auxiliary compound (c) may be the same as those described above with reference to the raw material (A3). The oxycarboxylic acid as the auxiliary compound (c) is generally used in such an amount that the content of the ester (oxycarboxylic acid ester) derived from the oxycarboxylic acid and contained in the aliphatic polyester is 2–50 mole %, preferably 5–40 mole %, based on a total of the ester components contained in the aliphatic polyester.

The carbonic acid ester as the auxiliary compound (c) may be a compound of the following formula (6):

$$R^{13}OCOOR^{14} \quad (6)$$

wherein $R^{13}$ and $R^{14}$ independently represent a lower alkyl group or an aryl group. When both $R^{13}$ and $R^{14}$ are each a lower alkyl, the two lower alkyl groups may be bonded to each other to form a cyclic ester. The lower alkyl group $R^{13}$, $R^{14}$ may have 1–6 carbon atoms, preferably 1–4 carbon atoms. The aryl group $R^{13}$, $R^{14}$ may have 6–10 carbon atoms, preferably 6–8 carbon atoms, such as phenyl. The carbonic acid ester as the auxiliary compound (c) is generally used in such an amount that the content of the ester (carbonic acid ester) derived from the carbonic acid and contained in the aliphatic polyester is 2–50 mole %, preferably 5–40 mole %, based on a total of the ester components contained in the aliphatic polyester.

The terephthalic acid compound as the auxiliary compound (c) may be terephthalic acid, anhydride thereof or an ester thereof. The terephthalic acid compound as the auxiliary compound (c) is generally used in such an amount that the content of the ester (terephthalic acid ester) derived from the terephthalic acid compound and contained in the aliphatic polyester is 1–20 mole %, preferably 3–10 mole %, based on a total of the ester components contained in the aliphatic polyester.

The polyhydric alcohols having at least three hydroxyl groups as the auxiliary compound (c) may be, for example, glycerin, diglycerin, a polyglycerin compound, trimethylol propane or pentaerythritol. The number of the hydroxyl groups of the polyhydric alcohol is generally 3–6.

The polyhydric alcohol as the auxiliary compound (c) is generally used in such an amount that the content of the components derived from the polyhydric alcohol and contained in the aliphatic polyester is 0.01–0.5 mole %, preferably 0.1–0.3 mole %, based on a total of the ester components contained in the aliphatic polyester.

The polyglycerin compound may be a compound represented by the following formula (7):

$$HO\text{—}[C_3H_5(OR^4)O]_n\text{—}H \quad (7)$$

wherein $R^4$ represents a hydrogen atom or an acyl group and n is an average polymerization degree which is generally 0.01–0.5, preferably 0.1–0.4. The acyl group may be represented by the following formula (8):

$$R^{15}CO\text{—} \quad (8)$$

where $R^{15}$ represents an aliphatic group having 1–20, preferably 1–6, carbon atoms, such as methyl, ethyl, propyl, butyl, hexyl, dodecyl and octadecyl. The polyglycerin compound as the auxiliary compound (c) is generally used in such an amount that the content of the ester (ether-containing ester) derived from the polyglycerin compound and contained in the aliphatic polyester is 0.01–0.5 mole %, preferably 0.1–0.4 mole %, based on a total of the ester components contained in the aliphatic polyester.

The polyoxyalkylene glycol as the auxiliary compound (c) may be a compound of the following formula (9)

$$HO\text{—}(AO)_m\text{—}H \quad (9)$$

wherein AO represents an alkyleneoxy group having 2–4 carbon atoms, such as ethyleneoxy, propyleneoxy, butyleneoxy and mixtures thereof, and m is an average polymerization degree which is generally 2–10, preferably 2–5. The polyoxyalkylene glycol as the auxiliary compound (c) is generally used in such an amount that the content of the ester (polyoxyalkylene glycol ester) derived from the polyoxyalkylene glycol and contained in the aliphatic polyester is 0.1–50 mole %, preferably 1–40 mole %, based on a total of the ester components contained in the aliphatic polyester.

As the auxiliary compound (c), an oxypolybasic carboxylic acid such as malic acid, terephthalic acid or citric acid, a diisocyanate, a triol-type polypropylene glycol, an orthoformic acid ester or polyethylene terephthalate may also be used. The oxypolybasic carboxylic acid and polyhydric alcohol (e.g. trimethylol propane, pentaerythritol or glycerin), which serve to control biodegradability and other properties of the polyester, are generally used in such an amount that the content of the components derived therefrom and contained in the aliphatic polyester is 0.01–0.5 mole %, preferably 0.1–0.4 mole %, based on a total of the ester components contained in the aliphatic polyester. In the case of polyethylene terephthalate, the amount used is 1–20 mole %, preferably 1–10 mole %.

Glycolic acid or its ester is generally used in such an amount that the content of the ester units derived therefrom and contained in the aliphatic polyester is 0.0001–0.3 mole %, preferably 0.01–0.2 mole %, based on a total of the ester components contained in the aliphatic polyester.

The raw material (A6) is a prepolymer of a mixture (A5).

The raw material (A7) is a mixture of (d) at least one oxycarboxylic acid compound and (e) at least one auxiliary compound other than oxycarboxylic acid compounds and selected from the group consisting of aliphatic compounds and aromatic compounds having at least two functional groups which are reactive with (d).

The oxycarboxylic acid compound (d) may be the same as that described above with reference to the raw material (A3). The auxiliary compound (e) is preferably selected from carbonic acid esters, terephthalic acid compounds, polyhydric alcohols having at least three hydroxyl groups and polyoxyalkylene glycols. The carbonic acid esters, terephthalic acid compounds, polyhydric alcohols and polyoxyalkylene glycols may be the same as those described above with reference to the auxiliary compound (c). As the auxiliary compound (e), an oxypolybasic carboxylic acid such as malic acid, citric acid, diisocyanate, an orthoformic acid ester, phthalic acid, polyethylene terephthalate may also be used. The auxiliary compound (e) is generally used in such an amount that the content of the auxiliary compound (e) in the aliphatic polyester is not greater than 50 mole %, preferably not greater than 40 mole % based on a total of the monomer components contained in the aliphatic polyester.

The raw material (A8) is a prepolymer of a mixture (A7).

The polycondensation of the above raw material is carried out in the presence of a metal-containing ester interchange catalyst (esterification catalyst) and a phosphorus-containing co-catalyst.

The metal-containing ester interchange catalyst is a compound, such as an alcoholate, acetylacetonate chelate or acetate, of a metal such as an alkali metal (e.g. Li or K), an alkaline earth metal (e.g. Mg, Ca or Ba), a main group element (e.g. Sn, Bi, Sb or Ge), a transition element (e.g. Pb, Zn, Cd, Mn, Co, Ni, Zr, Ti Nb, or Fe) or a lanthanide metal (e.g. La, Sm, Eu, Er or Yb). Illustrative of suitable main group element-containing catalysts are dibutyl tin oxide, dibutyl tin laurate, antimony trioxide, germanium oxide, bismuth oxide carbonate and bismuth oxide acetate. Illustrative of suitable rare earth metal-containing catalysts are lanthanum acetate, samarium acetate, europium acetate, erbium acetate and ytterbium acetate. Illustrative of suitable transition element-containing catalysts are lead acetate, zinc acetate, zinc acetylacetonate, cadmium acetate, manganese acetate, manganese acetylacetonate, cobalt acetate, cobalt acetylacetonate, nickel acetate, nickel acetylacetonate, zirconium acetate, zirconium acetylacetonate, titanium acetate, tetrabutoxy titanate, tetraisopropoxy titanate, titanium oxyacetylacetonate, iron acetate, iron acetylacetonate and niobium acetate. The use of a transition element-containing catalyst is particularly preferred.

The above metal-containing ester interchange catalysts may be used singly or in combination. The catalyst is generally used in an amount of $10^{-7}$ to 0.5 mole, preferably 0.005–0.3 mole, more preferably 0.01–0.15 mole, per 100 moles of the carboxyl group-containing compounds contained in the raw material for reasons of proper reaction rate and prevention of side reactions such as decomposition and crosslinking which cause coloring of the product.

The phosphorus-containing co-catalyst used in conjunction with the above metal-containing ester interchange catalyst is at least one compound selected from the following phosphorus compounds (B1)–(B8).

Co-catalyst (B1) is an organic phosphinic acid. The organic phosphinic acid may be represented by the following formula (10):

$$O=P(OH)R_2 \tag{10}$$

wherein R represents an aliphatic group or an aromatic group. The aliphatic group R may be linear or cyclic and have 1–12 carbon atoms, preferably 1–10 carbon atoms. The aromatic group R may be an aryl having 6–12 carbon atoms, preferably 6–10 carbon atoms or an aralkyl group having 7–12 carbon atoms, preferably 7–10 carbon atoms.

Illustrative of suitable organic phosphinic acids are phenylphosphinic acid, diphenylphosphinic acid, ditolylphosphinic acid, benzylphosphinic acid, methylphosphinic acid, n-butylphosphinic acid and cyclohexylphosphinic acid.

Co-catalyst (B2) is an monoammonium salt of hydrogen-containing phosphoric acid, such as ammonium dihydrogenphosphate.

Co-catalyst (B3) is a monoammonium salt of hydrogen-containing polyphosphoric acid.

Co-catalyst (B4) is a calcium salt of hydrogen-containing phosphoric acid, such as calcium phosphate dibasic or calcium dihydrogenphosphate.

Co-catalyst (B5) is a calcium salt of hydrogen-containing polyphosphoric acid.

Co-catalyst (B6) is a magnesium salt of hydrogen-containing phosphoric acid, such as magnesium phosphate dibasic or magnesium dihydrogenphosphate.

Co-catalyst (B7) is a magnesium salt of hydrogen-containing polyphosphoric acid.

The polyphosphates (B3), (B5) and (B7) had a degree of condensation (polymerization) of 2–10, preferably 2–6.

The co-catalyst is generally used in an amount providing an atomic ratio (P/M) of the phosphorus (P) of the co-catalyst to the metal (M) of said metal-containing ester interchange catalyst of 0.01–0.8, preferably 0.2–0.5.

By using the metal-containing catalyst in conjunction with the phosphorus-containing co-catalyst, aliphatic polyesters having a large molecular weight can be produced at a high reaction rate while preventing side reactions which result in the formation of tetrahydrofuran.

In one embodiment of the present invention, the raw material is heated in the presence of the metal-containing catalyst and the phosphorus-containing co-catalyst. It is preferred that the reaction be conducted while continuously removing water or a OH-containing compound such as methanol produced as a by-product. Thus, the reaction is preferably performed under conditions so that the water or OH-containing compound can be present as gas to expedite the removal thereof from the reaction system by distillation or by entrainment with a gaseous medium such as nitrogen gas. A reactor equipped with a distillation column is preferably used.

The reaction is generally performed at a temperature of 100–300° C., preferably 120–250° C., when methanol is produced as by-product. When by-product is water, the reaction is generally performed at a temperature of 130–300° C., preferably 145–250° C. The reaction may be performed at ambient pressure, a reduced pressure or under a pressurized condition. Ambient pressure or a reduced pressure is generally adopted.

To yield the aliphatic polyester efficiently, it is preferred that, when the reaction has proceeded to such a degree that about 90% of the calculated amount of the by-product (water or alcohol) has been obtained, the reaction conditions be changed by, for example, increasing the reaction temperature or by reducing the reaction pressure, so that polycondensation is accelerated with elimination of the aliphatic diol. Such reaction conditions are preferably such that the eliminated aliphatic diol can be present as gas.

In another embodiment, the polyester is produced by a two stage process including a first stage for the formation of prepolymers and a second stage for the polycondensation of the prepolymers.

In the first stage, the raw material is subjected to condensation in the presence of the metal-containing catalyst and the phosphorus-containing co-catalyst. The reaction temperature in the first stage is such that the by-product (water or alcohol) can be present as gas. The reaction pressure may be ambient pressure, a reduced pressure or an elevated pressure. Ambient pressure or a reduced pressure is generally adopted. The reaction is performed while removing the by-product. When the reaction has proceeded to such a degree that about 70–99% preferably 90–99%, of the calculated amount of the by-product (water or alcohol) has been obtained, the reaction temperature is increased and the reaction pressure is reduced. The first stage is generally carried out for 1–5 hours.

The thus formed reaction mixture containing oligomers are then polycondensed in the second stage. The metal-containing catalyst may be freshly added to the reaction mixture. In the second stage, aliphatic glycols bonded to termini of the oligomers are eliminated to obtain highly polycondensed polyesters having a weight average molecular weight of, for example, 80,000 or more. The reaction conditions in the second stage are such that the aliphatic glycol produced as by-product is present as gas. In the second stage, a higher reaction temperature and a lower reaction pressure are generally used than those in the first stage. The reaction pressure is preferably 0.005–5 Torr, more preferably 0.01–2 Torr. The reactor used for the second stage may be the same as that used in the first stage or may have an improved stirring efficiency as compared with that used in the first stage. The reaction time is generally 1.5–10 hours.

The phosphorus-containing co-catalyst is preferably added before commencement of the first stage but, if desired, may be added before start of the second stage.

In one embodiment, the polyester of the present invention contains ether-containing ester components of the formula (11) shown below and 1–30 mole %, preferably 5–20 mole %, of oxycarboxylic acid ester components of the formula (12) shown below and/or 1–30 mole %, preferably 5–20 mole %, of carbonic acid ester components of the formula (13) shown below:

$$(-CO-R^1-CO-O-R^2-O-) \tag{11}$$

$$(-CO-R^3-O-) \tag{12}$$

$$(-O-CO-O-) \tag{13}$$

wherein $R^1$, $R^2$ and $R^3$ are as defined previously.

In another embodiment, the polyester of the present invention contains oxycarboxylic acid ester components of the formula (14) shown below and 1–50 mole %, preferably 5–40 mole %, of carbonic acid ester components of the formula (15) shown below:

(—CO—R³—O—) (14)

(—O—CO—O—) (15)

wherein R³ is as defined previously.

In a further embodiment, the polyester of the present invention contains dicarboxylic acid ester components of the formula (16) shown below and 0.1–50 mole %, preferably 0.5–40 mole %, of ether containing ester components of the formula (17) shown below:

(—CO—R¹—CO—O—R²—O—) (16)

(—CO—R¹—CO—O—R⁴—O—) (17)

wherein R⁴ represents an ether group-containing divalent aliphatic group having 4–12 carbon atoms.

In yet a further embodiment, the polyester of the present invention contains terephthalic acid ester components of the formula (18) shown below in an amount of 0.1–20 mole %, preferably 0.5–10 mole %.

(—CO—C₆H₄—CO—) (18)

The aliphatic polyester obtained by the method of the present invention preferably has a weight average molecular weight of 80,000 or more and is substantially linear. The upper limit of the weight average molecular weight is generally about 300,000. The polyester is biodegradable in nature and permits recovery of the raw materials by alcoholysis or hydrolysis. The catalyst and co-catalyst may be separated from the polyester, if desired. Since the amount of the catalyst and co-catalyst is small, the separation thereof may be omitted to save costs.

The following examples will further illustrate the present invention. The molecular weight and molecular weight distribution of polyesters are measured by gel permeation chromatography (GPC) using chloroform as an eluent and polystyrene as a standard. The melting point and glass transition point of polyesters are measured with a differential scanning calorimeter (DSC), while the thermal decomposition temperature is measured with a thermogravimetric analyzer (TG). Breaking elongation is measured at 25° C. at a drawing rate of 10 mm per minute with a sample having a thickness of 0.25 mm (Japanese Industrial Standard JIS K7127, sample type 5).

EXAMPLE 1

In a 100 ml four-necked flask equipped with a stirrer, 180 mmol of succinic acid, 198 mmol of 1,4-butanediol, 0.12 mmol of titanium tetraisopropoxide and 0.04 mmol of ammonium dihydrogenphosphate (NH₄H₂PO₄) were charged. In the atmosphere of nitrogen, the mixture in the flask was heated to 140° C. and then, while removing water by distillation, gradually heated to 230° C. through about 1 hour. The reaction was continued for another 1 hour with stirring, while gradually reducing the pressure within the flask such that 0.5 Torr was reached finally. The polyester (containing the catalyst and co-catalyst) thus obtained was white and had a weight average molecular weight (hereinafter referred to as Mw) of 164,000, a number average molecular weight (hereinafter referred to as Mn) of 75,000 and Mw/Mn of 2.19.

Comparative Example 1

Example 1 was repeated in the same manner as described except that the ammonium dihydrogenphosphate was not used and that the reaction under the reduced pressure was continued for 80 minutes. The polyester thus obtained had Mw of 154,000 and Mw/Mn of 2.20.

Comparative Example 2

Comparative Example 1 was repeated in the same manner as described except that titanium tetraisopropoxide was used in an amount of 0.015 mmol and that the reaction under the reduced pressure was continued for 490 minutes. The polyester thus obtained was light yellow and had Mw of 78,000 and Mw/Mn of 1.71.

EXAMPLE 2

Example 1 was repeated in the same manner as described except that magnesium phosphate dibasic trihydrate (MgHPO₄.3H₂O) was substituted for ammonium dihydrogenphosphate and that the reaction under the reduced pressure was continued for 120 minutes. The polyester thus obtained was white and had Mw of 246,000 and Mw/Mn of 2.51.

Comparative Example 3

Example 1 was repeated in the same manner as described except that 0.04 mmol of disodium hydrogenphosphate (Na₂HPO₄) was used in addition to the ammonium dihydrogenphosphate and that the polycondensation was performed for 200 minutes. The polyester was brown and had Mw of 142,000 and Mw/Mn of 2.44.

Comparative Example 4

Example 2 was repeated in the same manner as described except that 0.04 mmol of dipotassium hydrogenphosphate (K₂HPO₄) was used in addition to the diammonium hydrogenphosphate and that the polycondensation was performed for 180 minutes. The polyester was brown and had Mw of 196,000 and Mw/Mn of 2.37.

EXAMPLE 3

Example 1 was repeated in the same manner as described except that diammonium hydrogenphosphate was substituted for ammonium dihydrogenphosphate. The polyester thus obtained was white and had Mw of 202,000 and Mw/Mn of 2.34. The resistance to hydrolysis of the polyester is, however, much lower than that of the polyester obtained in Example 1.

Comparative Example 5

In a 100 ml four-necked flask equipped with a stirrer, 180 mmol of succinic acid, 176.4 mmol of 1,4-butanediol, 19.6 mmol of diethylene glycol, 0.12 mmol of titanium tetraisopropoxide and 0.04 mmol of diphenylphosphinic acid (O=PPh₂(OH)) were charged. Then, the mixture was reacted in the same manner as described in Example 1 except that the reaction under the reduced pressure was continued for 138 minutes. The polyester thus obtained was white and had Mw of 160,300 and Mw/Mn of 2.01.

EXAMPLE 4

Example 1 was repeated in the same manner as described except that magnesium phosphate dibasic trihydrate (MgHPO₄.3H₂O) was substituted for ammonium dihydrogenphosphate and that the reaction under the reduced pressure was continued for 100 minutes. The polyester thus obtained was white and had Mw of 191,000 and Mw/Mn of 2.19.

EXAMPLE 5

In a 10 liter stainless steel autoclave equipped with a stirrer, 3,626 g of succinic acid, 2,906 g of 1,4-butanediol, 9.19 g of titanium tetraisopropoxide and 1.78 g of magnesium phosphate dibasic trihydrate ($MgHPO_4 \cdot 3H_2O$) were charged. In the atmosphere of nitrogen, the mixture in the flask was gradually heated from 32° C. to 240° C. through about 5 hours, while removing water by distillation, to obtain a prepolymer having Mw of 123,000. The reaction mixture was then transferred to a 6 liter horizontal polymerization reactor equipped with double axis stirring blades. The reaction was then further continued for 138 minutes with stirring, while gradually reducing the pressure so that 0.8 Torr was reached finally. The polyester thus obtained was white and had Mw of 215,000 and Mw/Mn of 2.22.

EXAMPLE 6

In a 10 liter stainless steel autoclave equipped with a stirrer, 3,626 g of succinic acid, 2,906 g of 1,4-butanediol, 350.5 g of ε-caprolactone, 85.9 g of diethylene glycol, 13.8 g of titanium tetraisopropoxide and 2.68 g of magnesium phosphate dibasic trihydrate ($MgHPO_4 \cdot 3H_2O$) were charged. In the atmosphere of nitrogen, the mixture in the flask was gradually heated from 30° C. to 220° C. through about 3 hours, while removing water by distillation, to obtain a prepolymer having Mw of 79,000. The reaction mixture was then transferred to a 6 liter horizontal polymerization reactor equipped with double axis stirring blades. The reaction was then further continued for 295 minutes with stirring, while gradually reducing the pressure so that 0.65 Torr was reached finally. The polyester thus obtained was white and had Mw of 250,000 and Mw/Mn of 2.26.

EXAMPLE 7

Example 4 was repeated in the same manner as described except that a mixture of 196 mmol of 1,4-butanediol and 2 mmol of diethylene glycol was substituted for 198 mmol of 1,4-butanediol. The polyester obtained was white and had Mw of 276,000 and Mw/Mn of 2.71.

EXAMPLE 8

Example 4 was repeated in the same manner as described using titanium tetraisopropoxide (Ti-Otip) and various co-catalysts including magnesium phosphate dibasic trihydrate (Mg—HP), diammonium hydrogenphosphate (Da—HP), ammonium phosphate tribasic trihydrate (APTT), ammonium dihydrogenphosphate (A—DHP) and calcium dihydrogenphosphate $CaH_2O_7P_2$ (Ca—DHP). Each of the polyesters thus obtained (containing the catalyst and co-catalyst) was tested for the resistance to hydrolysis. The test was carried out as follows. The polyester was formed into a film with a thickness of 0.25 mm. A film sample having a size of 25 mm×25 mm was placed in an incubator maintained at 80° C. and a relative humidity of 90% for given days T. Resistance to hydrolysis was determined in terms of a ratio Mw'/Mw where Mw' and Mw are weight average molecular weight of the sample after and before the test. The results are shown in Table 1.

TABLE 1

| Catalyst System | Test days T | Mw' (×10$^{-4}$) | Mw'/Mw |
|---|---|---|---|
| Ti-Otip | 0 | 10.26 | 1 |
|  | 2 | 6.86 | 0.67 |
|  | 4 | 4.67 | 0.46 |
|  | 6 | 3.17 | 0.31 |
|  | 8 | 2.39 | 0.23 |
| Ti-Otip/Mg-HP | 0 | 13.89 | 1 |
|  | 2 | 9.73 | 0.70 |
|  | 4 | 7.04 | 0.51 |
|  | 6 | 4.90 | 0.35 |

TABLE 1-continued

| Catalyst System | Test days T | Mw' (×10$^{-4}$) | Mw'/Mw |
|---|---|---|---|
|  | 8 | 3.67 | 0.26 |
| Ti-Otip/Da-HP | 0 | 19.40 | 1 |
|  | 2 | 10.39 | 0.53 |
|  | 4 | 5.63 | 0.29 |
|  | 6 | 3.59 | 0.19 |
|  | 8 | 2.47 | 0.13 |
| Ti-Otip/Ca-DHP | 0 | 15.17 | 1 |
|  | 2 | 7.93 | 0.52 |
|  | 4 | 4.89 | 0.32 |
|  | 6 | 3.39 | 0.22 |
|  | 8 | 2.29 | 0.15 |
| Ti-Otip/APTT | 0 | 14.30 | 1 |
|  | 2 | 8.16 | 0.57 |
|  | 4 | 4.52 | 0.32 |
|  | 6 | 3.02 | 0.21 |
|  | 8 | 2.18 | 0.15 |
| Ti-Otip/DHP | 0 | 15.10 | 1 |
|  | 2 | 9.60 | 0.64 |
|  | 4 | 6.37 | 0.42 |
|  | 6 | 4.24 | 0.28 |
|  | 8 | 2.86 | 0.19 |

From the results shown in Table 1, it is seen that the polybutylenesuccinate obtained using magnesium phosphate dibasic as a co-catalyst (Ti-Otip/Mg—HP) has the best resistance to hydrolysis.

EXAMPLE 9

Succinic acid, 1,4-butanediol and terephthalic acid were reacted in the same manner as that in Example 4 to obtain a polyester having 5 mole % of terephthalic acid ester components. The polyester was tested for its resistance to hydrolysis in the same manner as that of Example 8. Mw'/Mw after 8 days exposure to hydrolysis conditions was 0.61. The incorporation of terephthalic acid into the polyester is thus effective to improve resistance to hydrolysis.

EXAMPLE 10

Example 4 was repeated in the same manner as described except that 0.6 mmol of diphenyl phosphinic acid $(C_6H_5)_2PO(OH)$ was substituted for 0.4 mmol of magnesium phosphate dibasic trihydrate and that the reaction under the reduced pressure was continued for 4.3 hours. The polyester obtained had Mw of 102,000 and Mw/Mn of 1.65 and gave a film having mechanical properties shown in Table 2. In Table 2, mechanical properties of the polyester obtained in Comparative Example 1 are also shown.

TABLE 2

| Example No. | Modulus of Elasticity (MPa) | Yielding Point (MPa) | Breaking Point (MPa) | Breaking Elongation (%) |
|---|---|---|---|---|
| Comparative Example 1 | 358 | 29.7 | 38.5 | 391 |
| Example 10 | 330 | 26.5 | 67.3 | 826 |

From the results shown in Table 2, the breaking elongation of the polyester of Example 10 is much higher than that of Comparative Example 1.

The polyester was tested for its resistance to hydrolysis in the same manner as that of Example 8. Mw'/Mw after 8 days exposure to hydrolysis condition was 0.19. This value is higher than those of polyesters obtained using Ti-Otip/Da-HP or Ti-Otip/APTT. Diphenyl phosphinic acid gives a polyester having good resistance to hydrolysis.

EXAMPLE 11

In a 100 liter stainless steel autoclave equipped with a stirrer, 38 kg of succinic acid (SA), 25.01 kg of 1,4- butanediol, 6.48 kg of 6-caprolactone (CL), 2.01 kg of diethylene glycol (DG), 48.14 g of titanium tetraisopropoxide and 9.35 g of magnesium phosphate dibasic trihydrate (MgHPO$_4$.3H$_2$O) were charged. In the atmosphere of nitrogen, the mixture in the flask was heated to 140° C. and then, while removing water by distillation, gradually heated to 220° C. through about 5 hours. The reaction was further continued for 9.2 hours with stirring, while gradually reducing the pressure so that 0.5 Torr was reached finally. The polyester thus obtained had Mw of 154,000 and Mw/Mn of 2.20 and showed breaking elongation of 701%. The mole % of CL+DG feed based on the total ester units (SA+CL) was 20%.

EXAMPLE 12

In a 10 liter stainless steel autoclave equipped with a stirrer, 3,626 g of succinic acid, 2787.3 of 1,4-butanediol, 1502.2 g of ε-caprolactone, 139.7 g of diethylene glycol, 4.59 g of titanium tetraisopropoxide and 0.893 g of magnesium phosphate dibasic trihydrate (MgHPO$_4$.3H$_2$O) were charged. In the atmosphere of nitrogen, the mixture in the flask was heated to 140° C. and then, while removing water by distillation, gradually heated to 240° C. through about 5 hours. The reaction was further continued for 11 hours with stirring, while gradually reducing the pressure so that 0.5 Torr was reached finally. The polyester thus obtained had Mw of 228,000 and Mw/Mn of 2.32 and showed breaking elongation of 1306%. The mole % of CL+DG feed based on the total ester units (SA+CL) was 32%.

EXAMPLE 13

In a 100 ml four-necked flask equipped with a stirrer, 100 mmol of succinic acid, 105 mmol of 1,4-butanediol, 10 mmol of ε-caprolactone, 0.033 mmol of titanium tetraisopropoxide and 0.0165 mmol of diphenylphosphinic acid (C$_6$H$_5$)$_2$PO(OH) were charged. In the atmosphere of nitrogen, the mixture in the flask was heated to 140° C. and then, while removing water by distillation, gradually heated to 230° C. through about 1 hour. The reaction was continued for 5 hours with jig stirring, while gradually reducing the pressure within the flask such that 0.5 Torr was reached finally. The polyester thus obtained had Mw of 88,000 and Mw/Mn of 1.63 and showed breaking elongation of 2246%. The mole % of CL feed based on the total ester units (SA+CL) was 50%.

What is claimed is:

1. A method of producing an aliphatic polyester, comprising polycondensing a raw material selected from the group consisting of
   (A1) mixtures of an aliphatic diol and at least one aliphatic dicarboxylic acid compound selected from the group consisting of aliphatic dicarboxylic acids, diesters of aliphatic dicarboxylic acids and aliphatic dicarboxylic acid anhydrides,
   (A2) prepolymers of mixtures (A1),
   (A3) oxycarboxylic acid compounds,
   (A4) prepolymers of oxycarboxylic acid compounds (A3),
   (A5) mixtures of (a) an aliphatic diol, (b) at least one aliphatic dicarboxylic acid compound selected from the group consisting of aliphatic dicarboxylic acids, diesters of aliphatic dicarboxylic acids and aliphatic dicarboxylic acid anhydrides and (c) at least one auxiliary compound selected from the group consisting of aliphatic compounds and aromatic compounds having at least two functional groups which are reactive with at least one of (a) and (b),
   (A6) prepolymers of mixtures (A5),
   (A7) mixtures of (d) at least one oxycarboxylic acid compound and (e) at least one auxiliary compound other than oxycarboxylic acid compounds and selected from the group consisting of aliphatic compounds and aromatic compounds having at least two functional groups which are reactive with (d), and
   (A8) prepolymers of mixtures (A7) in the presence of a metal-containing ester interchange catalyst and MgHPO$_4$.3H$_2$O as a co-catalyst
   wherein said co-catalyst is present in an amount providing an atomic ratio of the phosphorus of said co-catalyst to the metal of said metal-containing ester interchange catalyst of 0.0 1–0.8.

2. A method as claimed in claim 1, wherein said aliphatic compounds and aromatic compounds of said auxiliary compound (c) are selected from the group consisting of carbonic acid esters, terephthalic acid compounds, polyhydric alcohols having at least three hydroxyl groups and polyoxyalkylene glycols.

3. A method as claimed in claim 1, wherein said aliphatic compounds and aromatic compounds of said auxiliary compound (e) are selected from the group consisting of carbonic acid esters, terephthalic acid compounds, polyhydric alcohols having at least three hydroxyl groups and polyoxyalkylene glycols.

4. A method as claimed in claim 1, wherein said auxiliary compound (c) is used in such an amount that the content of the auxiliary compound (c) in the aliphatic polyester is 2–50 mole % based on a total of the monomer components contained in the aliphatic polyester.

5. A method as claimed in claim 2, wherein said auxiliary compound (e) is used in such an amount that the content of the auxiliary compound (e) in the aliphatic polyester is not more than 30 mole % based on a total of the monomer components contained in the aliphatic polyester.

6. A method as claimed in claim 1, wherein said metal-containing ester interchange catalyst is used in an amount of $10^{-7}$ to 0.5 mole per 100 moles of the carboxyl group-containing compounds contained in said raw material.

7. A method as claimed in claim 1, wherein said polycondensation is performed so that the aliphatic polyester produced has a weight average molecular weight of at least 80,000.

8. An aliphatic polyester produced by a method according claim 1 and containing said metal-containing ester interchange catalyst and said co-catalyst.

9. A method as claimed in claim 1 wherein said raw material is A1 or A5.

10. A method as claimed in claim 1 conducted in stages comprising:
   a first stage wherein said raw material is condensed in the presence of the metal-containing ester interchange catalyst and MgHPO$_4$.3H$_2$O co-catalyst at a temperature whereat water and alcohol byproducts are in gaseous phase, while removing the byproducts, to form a reaction mixture containing oligomers; and
   a second stage wherein the oligomers are polycondensed at a temperature higher than that of the first stage and at a lower reaction pressure than in the first stage, to eliminate aliphatic glycols bonded to termini of the oligomers and to form the aliphatic polyester as a highly polycondensed polyester having a weight average molecular weight of at least 80.000.

* * * * *

UNITED STATES PATENT AND TRADEMARK OFFICE
CERTIFICATE OF CORRECTION

PATENT NO. : 6,639,045 B2
DATED : October 28, 2003
INVENTOR(S) : Masuda et al.

It is certified that error appears in the above-identified patent and that said Letters Patent is hereby corrected as shown below:

Column 9,
Line 11, "ether containing" should read -- either-containing --.

Column 12,
Table 2, line Example 10, under the heading "Breaking Point", "67.3" should read -- 67.8 --.

Column 13,
Line 1, "6-caprolactone" should read -- $\epsilon$-caprolactone --.

Column 14,
Line 15, "0.0 1" should read -- 0.001 --; and
Line 18, after "of" insert -- oxycarboxylic acid compounds --;

Signed and Sealed this

Fifth Day of October, 2004

JON W. DUDAS
*Director of the United States Patent and Trademark Office*